United States Patent [19]

Caputi, Jr.

[11] 4,325,065
[45] Apr. 13, 1982

[54] BISTATIC IMAGING RADAR PROCESSING FOR INDEPENDENT TRANSMITTER AND RECEIVER FLIGHTPATHS

[75] Inventor: William J. Caputi, Jr., Centerport, N.Y.

[73] Assignee: Eaton Corporation, Cleveland, Ohio

[21] Appl. No.: 65,213

[22] Filed: Aug. 9, 1979

[51] Int. Cl.³ ............................................. G01S 13/90
[52] U.S. Cl. ................................................. 343/5 CM
[58] Field of Search ..................................... 343/5 CM

[56] References Cited

U.S. PATENT DOCUMENTS

| | | | |
|---|---|---|---|
| 3,624,650 | 11/1971 | Paine | 343/5 CM X |
| 3,825,928 | 7/1974 | Williams | 343/5R |
| 3,895,381 | 7/1975 | Kock | 343/5 CM |
| 4,246,580 | 1/1981 | Caputi, Jr. | 343/5 CM |

Primary Examiner—T. H. Tubbesing
Attorney, Agent, or Firm—Kevin Redmond

[57] ABSTRACT

A process for correcting data from a bistatic synthetic aperture radar to eliminate distortions and resolution limitations due to the relative positions and motions of the radar transmitter and receiver with respect to a target.

4 Claims, 25 Drawing Figures

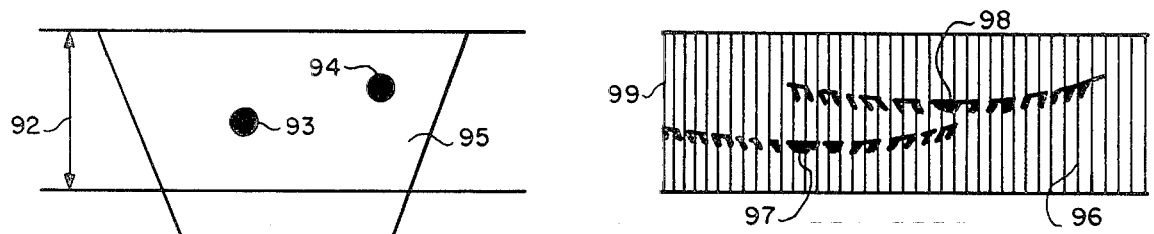
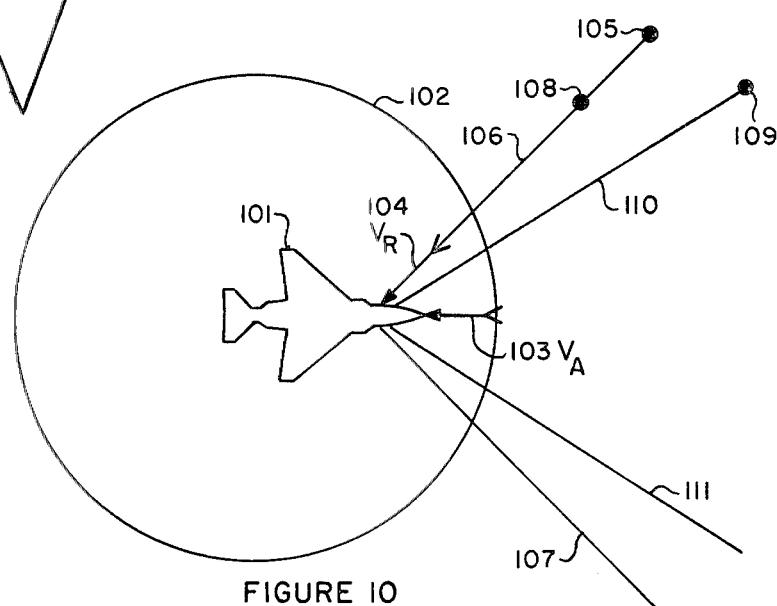
FIGURE 10
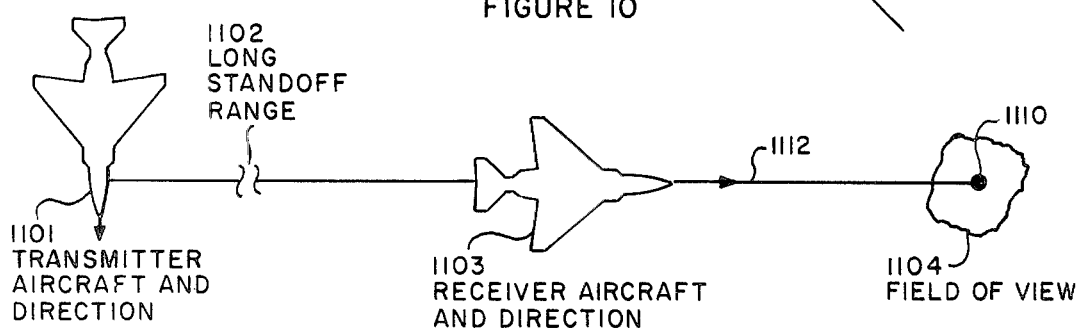
A. IN-LINE GEOMETRY
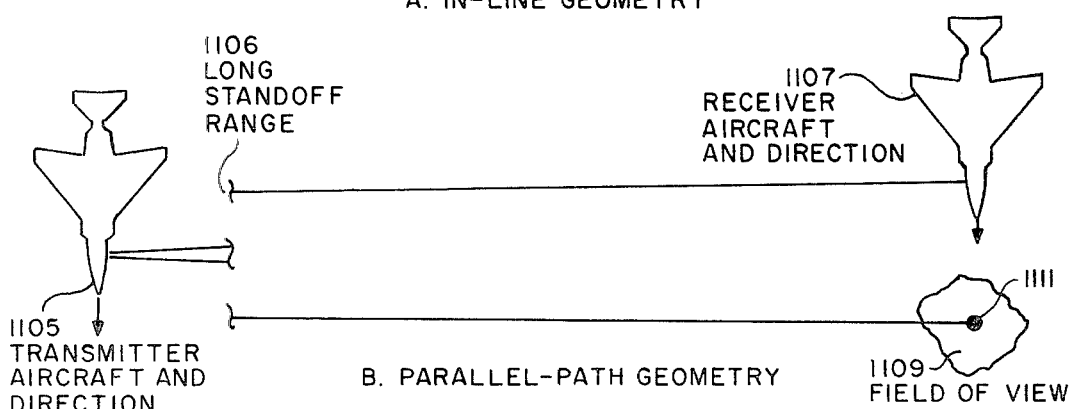
B. PARALLEL-PATH GEOMETRY
FIGURE 11

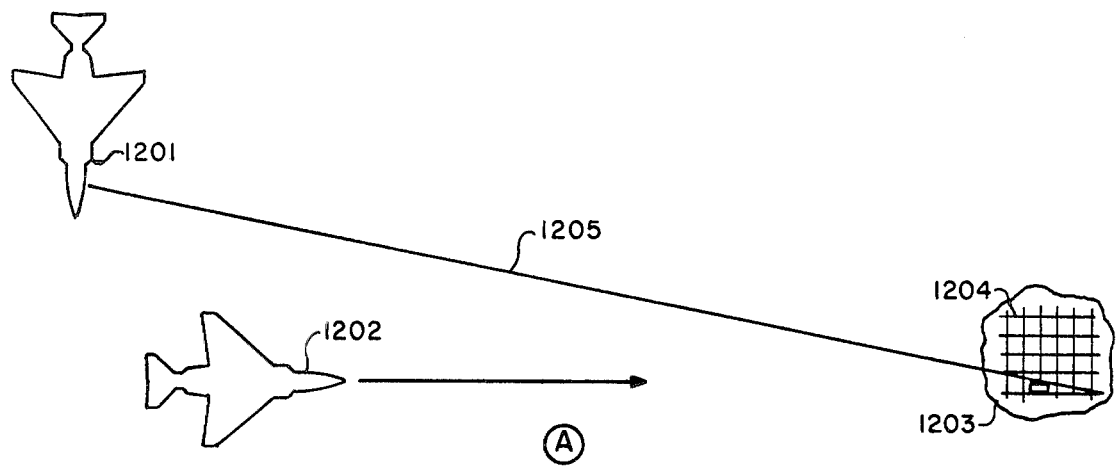
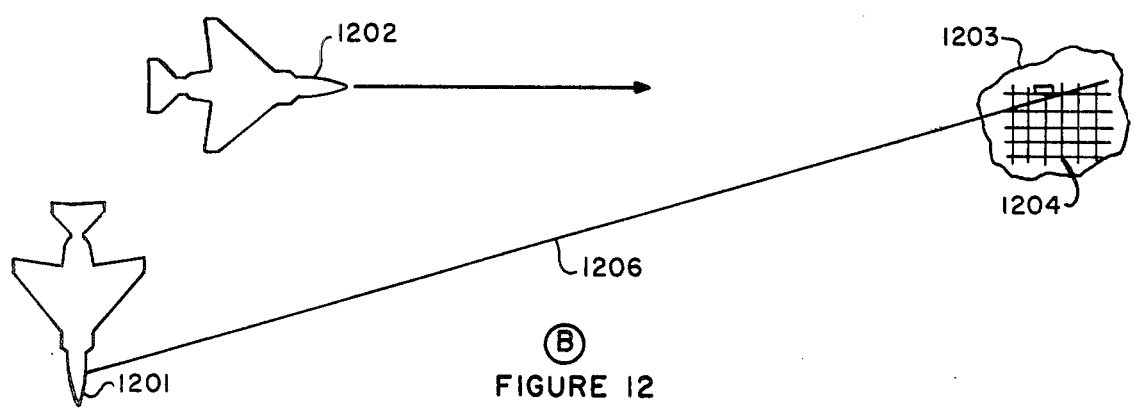
FIGURE 12
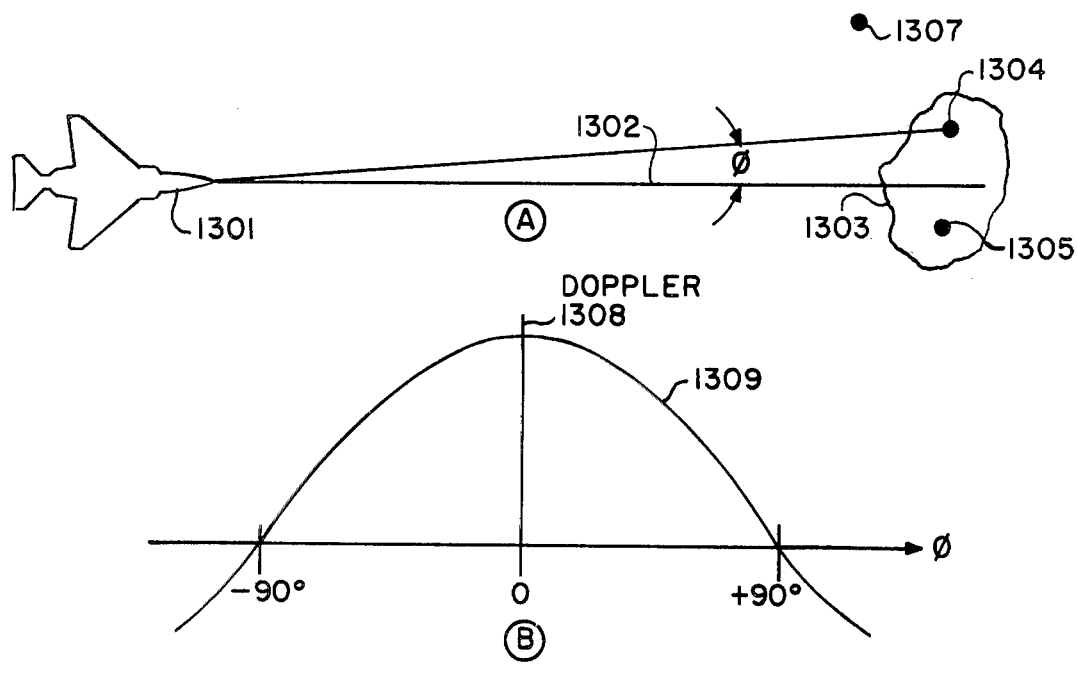
FIGURE 13

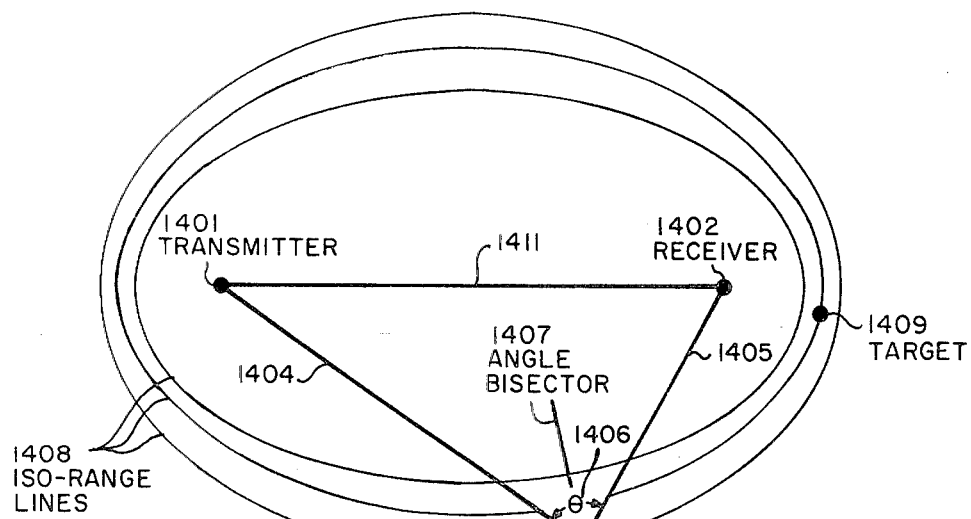
FIGURE 14
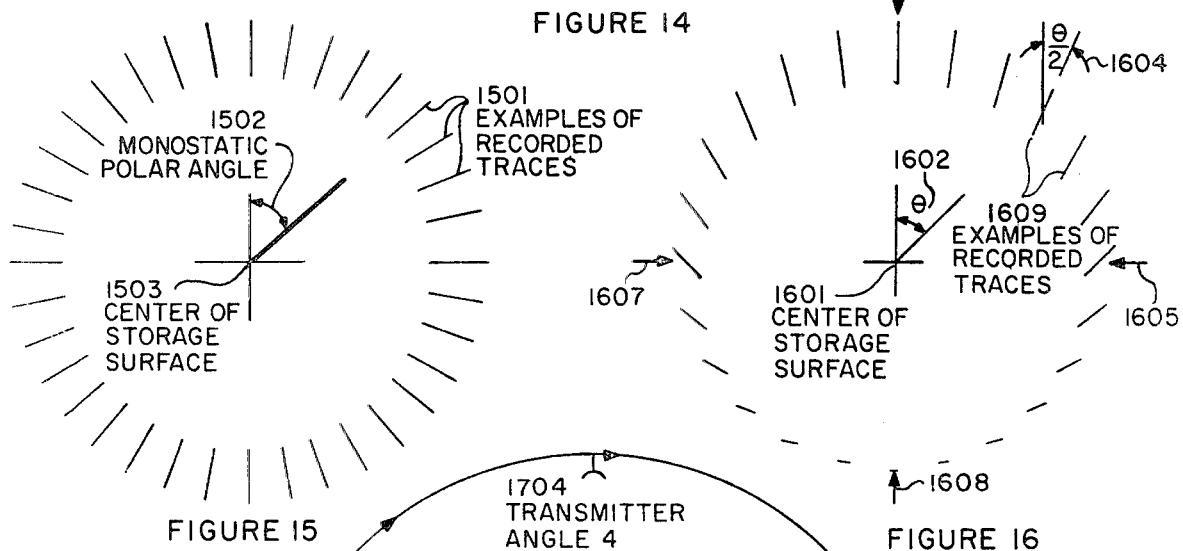
FIGURE 15
FIGURE 16
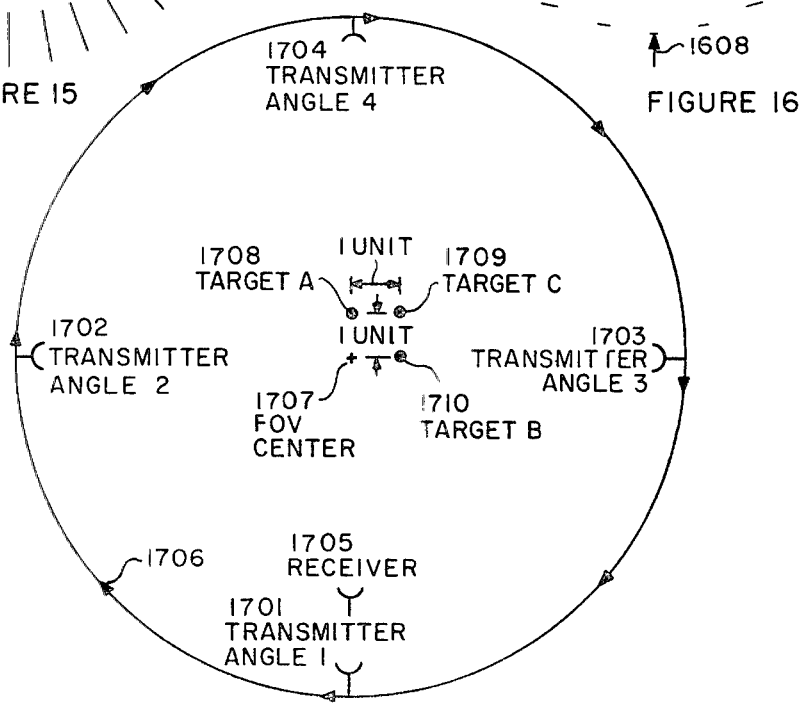

BISTATIC IMAGING RADAR PROCESSING FOR INDEPENDENT TRANSMITTER AND RECEIVER FLIGHTPATHS

BACKGROUND

1. Field

This invention relates to the processing of synthetic aperture radar data and, in particular, to the processing of bistatic synthetic aperture radar data.

2. Prior Art

In early radar systems, fine range resolution was obtained by transmitting a narrow pulse, while fine azimuth resolution was obtained by radiating a narrow beam. In more modern radars, pulse compression techniques or active linear FM techniques, commonly referred to as Stretch techniques, are used to produce a long pulse which can, through appropriate processing, provide the range resolution of a narrow pulse.

For example, in the Stretch technique, a linear FM signal is transmitted. The return signal is mixed with a sample of the transmitted signal to produce an output signal at a frequency which is dependent on the range of the target. The range resolution in the Stretch technique is a function of the bandwidth of the transmitted linear FM signal, or alternatively, the resolution may be considered dependent on the range to frequency scale factor and the degree to which the frequency of the output signal for a particular target can be ascertained.

A narrow beamwidth was previously obtained through the use of a large antenna; however, in a more modern technique known as synthetic aperture radar, or SAR, a small antenna can provide the effective aperture of a large antenna. This is accomplished by moving the antenna along a path, the length of which determines the synthetic aperture within the limitation imposed by the antenna beamwidth. The data received along the path is stored and later processed to produce a high resolution image. Conventional SAR radar and its processing are discussed in a number of publications, including *The Radar Handbook*, by M. Skolnik, McGraw-Hill, New York 1970.

A simple Stretch system is shown in FIG. 1. A transmitter 11 generates a linear FM signal which is passed through a coupler 12, to a first antenna 13, where it is radiated. The radiated signal is returned by a target 15 to a second antenna 14, where it is passed to a mixer 16. The mixer also receives a portion of the transmitted signal by way of the coupler 12 to serve as a local oscillator signal. The mixer output signal, at port 17, often is converted to range information at port 19 by a Fourier transformer 18, which is usually a pulse compression network.

The operation of the system of FIG. 1 can be understood with the aid of FIG. 2. FIG. 2 is a graph containing a plot of a transmitted signal 24, a received signal 25, and an output signal 26. The ordinate 22 represents frequency while the abscissa 23 represents time. The frequency axis is divided in two, with the upper portion being the normalized transmitted frequency, while the lower portion is the output frequency, which is calibrated in megahertz (MHz).

FIG. 2 is an example of the performance characteristics of a typical Stretch system. The transmitted signal varies linearly from 0.8 to 1.2 times the center frequency over a normalized period, while the received signal varies over the same frequency range, but is shown delayed by a time corresponding to the time for the signal to traverse the round trip radar path length to the target and back to the receiver. When these two signals mix in the mixer 16, shown in FIG. 1, they produce a constant low output frequency such as a 4 MHz signal designated by drawing numeral 26, in FIG. 2.

The frequency difference between the transmitted and return signals is proportional to the delay which, in turn, is proportional to the target range. Therefore, an output signal representing a target at a fixed range will be at a frequency that is proportional to the range of the target. In a practical Stretch system, the mixer reference signal obtained via coupler 12 may be delayed a known amount to establish a reference range. The output signal for a target at that range will then be zero frequency.

A rudimentary SAR system is shown in FIG. 3. In this Figure, antennas 31, 32, and 33 produce antenna patterns 34, 35, and 36, respectively, illuminating a target 37.

The antenna and antenna patterns shown in FIG. 3 may be considered a simple phased array antenna system. The signals from each antenna may be phase shifted, weighted and then combined with the signals from the other antennas to produce an effective pattern 39, which is narrower and higher in gain than any of the individual antennas. The narrow beamwidth of the effective pattern may then be used for improved angle resolution.

A SAR system is, in effect, a special case of a phased array system. Although a SAR system usually contains only a single antenna, this antenna is moved to simulate a number of antennas. For example, a single antenna of a SAR system could first be positioned at the location of antenna 31. In this location, it would produce a pattern similar to pattern 34. The signal received at this location containing target information is stored. The single SAR antenna is then moved to the location of antenna 32 and later to that of antenna 33 with the received data at each location being stored. The stored data is then weighted, phase shifted and combined to provide the same results which would have been obtained with three separate antennas.

In practical applications, the single SAR antenna is often located aboard an aircraft. The antenna is continually in motion rather than being shifted in incremental fashion from position to position; however, the transmission period is relatively short, making the distance moved per transmission period equally short. In this case, each transmission may be considered as occurring at a single location.

FIG. 8 illustrates the operation of a typical SAR in an aircraft 81, flying along a flight path 86. The SAR antenna is directed constantly to the side of the aircraft, as shown by directional arrows, such as arrow 82. The radar beam 84 illuminates a swath on the ground 83 and at a particular instant illuminates an area, such as area 85.

A commonly used method for recording SAR data is to print the data on photographic film, such as on the film shown in FIG. 4, using intensity modulation. In this Figure, a film 41 contains a series of lines, such as lines 42 and 43. Each line contains data received as a result of a single transmitted pulse. If Stretch is combined with SAR the peaks of the sinousoidal return signals are recorded as short, dark portions along the line.

FIG. 9A shows the coverage by a SAR radar of two targets. The radar beamwidth 91 illuminates two targets, 93 and 94, in an area of illumination on the ground indicated by the swath 95 of width 92. When the signals from the targets are recorded on film 99 via a series of range sweeps, such as range sweep 96, they appear as shown in FIG. 9B, where signal history 98 corresponds to target 94 and signal history 97 corresponds to target 93. The target histories are curved and cannot be both correct by simple geometric manipulation.

For a Stretch SAR, a single target at a constant range would produce a single frequency, such as the 4 MHz signal illustrated in FIG. 2. This type of return signal would simply produce a series of constant size dots separated by a constant spacing. The dots correspond to the peaks of a 4 MHz signal. A return signal produced by a number of targets generates a more complex darkening of the line.

The data may be recorded on the film simply by displaying the received signal on an oscilloscope and focusing the display on the film. In such a system, the sweep speed corresponds to the rate at which the return signal is printed while the separation between the raster lines corresponds to the distance the antenna travels between pulses.

The data recorded in this form is in terms of frequency and time of receipt, rather than the more conventional target intensity and range. Obtaining the SAR Stretch data in more conventional form requires conversion of the frequency information in the vertical direction to range information. This function may be carried out in analogue fashion by means of a device such as a spectrum analyzer. It also may be carried out in digital fashion by means of a Fourier transform in the vertical direction. To complete the conversion from darkened lines to an image, the data must also be weighted, phase shifted, and properly combined in the horizontal direction.

An improved form of SAR referred to as Spotlight, differs from standard SAR in that the antenna is directed at a single target area, while the antenna is moved along the flight path. The data is also preprocessed by subtracting the Doppler of a reference target in the area, to simplify subsequent data combining. As long as the target area is illuminated, the path length becomes the synthetic aperture for this target. The synthetic aperture, therefore, is not limited by the beamwidth as is the case with a conventional SAR. Furthermore, data combining can now be performed approximately by horizontal Fourier transform.

The data from a Stretch-Spotlight SAR can be corrected so that data combining can be performed exactly with a horizontal Fourier transform, by using a fourth technique known as polar formatting.

FIG. 6 illustrates a Spotlight radar. In this Figure, an aircraft 60 is shown at three positions, 61, 62, 63, along a flight path, indicated by direction arrows 68 and 69. At each point along the flight path, the radar beam is directed at a target 67. The radar beam for positions 61, 62, and 63, is illustrated by beams 64, 65, and 66. Since the angle of the antenna with respect to the flight path is continually changing along the path, the data should not be recorded in the simple straight line fashion, shown in FIG. 4. To correct for the constant change in angle, the data is recorded in polar format, such as that shown in FIG. 7. In this Figure, data lines, such as lines 72 and 73, are recorded on a film 71 in polar coordinates.

It is fortunate that a simple means of providing a complete conversion of Stretch-Spotlight data to an image is available. The data in the form shown in FIG. 7 may be converted directly to an image by means of a spherical lens. This process is shown pictorially in FIG. 5. In this Figure, a reflector 51 directs light from a light source 52 through a columnating lens 53. The columnated light 54 passes through a film 55 containing the record data. The light emerging from the film is then passed through a spherical lens 56 where the light rays 57 are converged to produce an image on the screen or second film 58. This simple, complete conversion only works exactly on Stretch-Spotlight polar formatted monostatic SAR data.

In the SAR systems described above, it is assumed that the transmitter and receiver are located on board the same platform, such as aboard a single aircraft. This type of system is referred to as a monostatic imaging radar system. It is advantageous in some applications to place the transmitter aboard one platform and the receiver aboard another. This type of system is referred to as a bistatic imaging radar system. A serious problem arises in properly recording the received data from a bistatic system so that an image may be produced by the relatively simple Fourier transform method similar to that shown in FIG. 5.

Bistatic radar presents fundamental geometric processing problems which are similar in some respects, to those encountered in monostatic SAR technology. These geometric problems arise from target motion through resolution cells and are, in fact, a direct result of the geometric motion of what is referred to as the iso-Doppler and iso-range lines of the bistatic radar system during the interval required to collect the data for image formation. In particular, for most bistatic geometries, the iso-Doppler and iso-range lines are not perpendicular and, if this data is processed conventionally, it will result in a skewed image, such as an square object being imaged as a parallelogram. Furthermore, since the image skewing varies with time, changes in the skew of the parallelogram will limit the resolution that can be achieved.

Iso-Doppler and iso-range lines for a monostatic SAR system are shown in FIG. 10. In this Figure, an aircraft 101 carrying a SAR is moving at a velocity $V_a$ 103. The vector $V_a$ is the relative velocity with respect to the aircraft of a target directly ahead. The SAR may be considered the center of a series of concentric spheres, such as sphere 102, which represents a constant range from the SAR. Where these spheres intersect a plane, such as the earth surface, they produce circles which are referred to as iso-range lines.

All targets along a line emanating from the SAR have at one instant in time, a constant relative velocity toward the SAR. For example, targets 105 and 108 on line 106 have a relative velocity of $V_R$, represented by vector 104, towards the SAR. These targets will produce the same Doppler frequency because of their same relative velocity towards the SAR and therefore the line 106 is referred to as an iso-Doppler line.

All targets on lines making the same angle with the aircraft velocity vector, $V_a$ will have the same property because they will all have the same relative velocity $V_R$ towards the SAR. These lines form a cone. Lines 106 and 107 represent the intersection of the cone with a plane, such as the earth's surface.

An infinite number of cones are possible. For example, lines 110 and 111 represent the intersection of another iso-Doppler cone with the earth surface.

Conventionally, a sharp gradient in iso-Doppler lines is represented by a high density of lines, while the direction of the gradient is taken as being perpendicular to the iso-Doppler lines. A similar representation is used for iso-range lines.

Note that in the monostatic system depicted in FIG. 10, the iso-Doppler lines are radial and therefore intersect the iso-range circles at right angles. As will be shown, the configuration of iso-range and iso-Doppler lines in most instances is quite different for bistatic radar.

FIG. 12 shows the change in iso-Doppler and iso-range lines as the transmitter position is changed. The transmitting aircraft 1201 is shown prior to crossing the flightpath of the receiving aircraft's 1202 in FIG. 12A, while the transmitting aircraft is shown after having crossed the receiving aircraft's flightpath in FIG. 12B. Idealized iso-Doppler and iso-range lines 1204 are shown within the field of view 1203. Actual iso-range lines are perpendicular to the bistatic angle bisector, while actual iso-Doppler lines are parallel to the lines 1205 or 1206.

The central problem in bistatic radar is target location. It is necessary to determine how range delay and Doppler shift relates to target position.

It will be assumed that a Stretch system will be used throughout and in this Stretch system the definition of range delay is the relative time between the received signal from the target and the signal from a reference point of known position. This approach requires the least knowledge of transmitter and receiver positions.

It also will be assumed that a Spotlight system will be used throughout and in such a system a Doppler shift in bistatic radar is due to the movement of both the transmitter and receiver. Doppler will be taken with respect to a reference point, which is usually located within the field of view. The Doppler at this point will be set to zero; that is, the Doppler at the reference point will be subtracted from the Doppler at all other points in the field of view.

Referring to FIG. 11, to simplify the description, it will first be assumed that in FIG. 11A the receiver aircraft 1103 is always directed toward the field of view 1104 so it appears nonrotating by an observer 1110 located in the field of view, while the transmitter 1101 is always broadside to the field of view, so it appears to be rotating.

In FIG. 11B, the receiver aircraft 1107 is shown flying on a path parallel to the transmitter aircraft 1105. The receiver aircraft is still directed towards the field of view 1109 so it appears nonrotating by an observer 1111 located in the field of view, while the transmitter aircraft 1105 remains broadside to the field of view so that it appears to rotate.

In order to understand the purpose of the present invention, it is necessary to compare the iso-Doppler and iso-range line configurations for monostatic and bistatic radar. First note that the position of the nonrotating, receiving aircraft does not influence the position of the iso-Doppler lines.

The reason the receiving aircraft does not produce a Doppler gradient is explained with the aid of FIG. 13. In FIG. 13A, a receiving aircraft 1301 is shown approaching a field of view 1303 which contains two targets 1304 and 1305. The angle that target 1304 makes with the line of flight 1302 is designated $\phi$.

Since the receiving aircraft is almost directly approaching the target 1304, its Doppler is high; however, there is little change in Doppler throughout the approach because the target 1304 essentially remains directly ahead and the aircraft remains at a constant velocity.

On the other hand, if the field of view were shifted to another target off to the side, such as target 1307, the Doppler due this target would change at the same rate as the velocity component of the aircraft toward the target.

FIG. 13B is a graph of the Doppler with respect to the angle $\phi$. In this Figure, the ordinate 1308 is the magnitude of the Doppler shift while the abscissa is the angle $\phi$. The plot 1309 is a cosine function, which corresponds to the component of velocity towards a target at an angle $\phi$ from the aircraft. It can be seen from this graph that, although the highest absolute Doppler value is produced where $\phi$ is equal to zero, the greatest rate of change is produced where $\phi$ is 90 degrees. Therefore, for this simplified example the receiving aircraft with $\phi$ nearly equal to zero introduces a large Doppler shift to all targets in the field of view, but produces little change in the Doppler shift. Consequently, the receiving aircraft does not influence the position of the iso-Doppler lines, whereas the transmitting aircraft, with a value of $\phi$ of nearly 90 degrees, produces virtually all the change in Doppler across the field of view and essentially establishes the iso-Doppler lines.

Since the transmitter aircraft is the only aircraft producing the iso-Doppler lines, they will be radial lines drawn from the transmitter to a target and as the aircraft moves, these lines will rotate about the target.

The direction of the iso-range lines in the target area will also rotate, but not at the same rate as the iso-Doppler lines. This can be seen with the aid of FIG. 14.

In this Figure, a transmitter 1401 and a receiver 1402 form the foci for a series of eliptical iso-range lines 1408. A target 1403 is shown located on one of the iso-range lines. An angle $\theta$, referred to as the bistatic angle, is located at the target and is defined by lines 1404 and 1405 drawn from the target to the transmitter and a receiver, respectively. Line 1407 is the angle bisector of the bistatic angle.

By definition, all targets which produce signals that arrive at the receiver at the same time are located on an iso-range line. For a signal to arrive at the same time as another signal, its total path length from the transmitter to a target and then to the receiver, must be the same, or the sum of the length of line 1404 and 1405 must be a constant. A constant sum for these two line lengths is one definition of an ellipse and accordingly explains the elliptical contours of the iso-range lines for the bistatic case.

The line 1404 is an iso-Doppler line as it connects the transmitter with the target. The angle of the iso-Doppler line may be taken with respect to any reference line, such as the line 1405. If the line 1405 is chosen, then the angle of the iso-Doppler line 1404 is equal to the bistatic angle.

If in FIG. 14 it is assumed that the transmitter is moved on any flight path, except the one directed toward target 1403, the bistatic angle will change, as will the angle of the iso-Doppler line. The direction of the iso-range line, which is the tangent to the iso-range ellipse at the target, is perpendicular to the bistatic angle bisector 1407. The direction of the iso-range lines in the target area therefore changes with the angle bisector 1407.

As long as the receiver is either stationary or moves toward or away from the target 1403, the change in the angle of the iso-Doppler lines can be taken as being equal to the change in bistatic angle, while the change in the direction of the iso-range lines is equal to the change in one-half the bistatic angle.

If in the general case, both receiver and transmitter rotate about the field of view, the iso-range lines behave in the same way, however, the iso-Doppler lines are affected by the receiver rotation. In the extreme case in which the transmitter and receiver rotate at the same rate and direction about the field of view, the iso-range lines remain perpendicular to the bistatic angle bisector, but the iso-Doppler lines become parallel to the bistatic angle bisector, and therefore, remain perpendicular to the iso-range lines at all times. Thus in the extreme, no change in monostatic polar processing is required, as the bistatic system behaves monostatically. The intermediary cases can be considered as a combination of the present invention with conventional polar format processing.

Returning now to the simple example of the nonrotating receiving station, the initial orientation of the iso-Doppler and iso-range lines in the field of view for the bistatic case is generally not orthogonal except for the special case when both the aircraft and target are on the same straight line; however, it might be possible to correct for the skewed image caused by the lack of orthogonality by conventional topographical image reconstitution techniques if the bistatic angle changes only a small amount over the synthetic aperture.

Since the direction of the iso-Doppler and iso-range lines change at different rates, it would also be possible to make some additional correction in processing the recorded data for larger bistatic angle changes by, in effect, rotating the data at a speed halfway between the rate of change in the direction of the iso-Doppler lines and the iso-range lines. The improvement provided by this correction is obviously limited because neither the rotation of the iso-Doppler nor that of the iso-range lines is completely corrected.

Also note from FIG. 14 that increase of the bistatic angle 1406 is accompanied by a spreading apart of the iso-range ellipses as the iso-range lines are closer together for target 1409 than for target 1403. This phenomonon is equivalent to a loss or dilution of range resolution caused by a change in the scale factor between distance and time delay. The simple corrections described above would not correct for the loss of range resolution.

SUMMARY

It is an object of the present invention to provide a system for correcting and storing the data received from a bistatic imaging radar system to permit simple Fourier transform processing to produce images directly from the recorded data.

In the present invention, the bistatic angle, $\phi$, the receiver angle $\alpha$, and a pulse which is coincident with the transmitted pulse, are the only real time input required to produce the correction of the bistatic data for proper recording. Other possible inputs, such as the start frequency of the transmitted pulse, are usually constant values which may be set into the equipment as one-time-only initial adjustments.

BRIEF DESCRIPTION OF THE FIGURES

FIG. 9 is a diagram showing the coverage by a SAR radar of two targets and the appearance of these targets when recorded on film.

FIG. 10 is a pictorial diagram illustrating iso-range and iso-Doppler lines for a monostatic SAR.

FIG. 11 is a diagram illustrating in-line and parallel path geometry.

FIG. 12 is a diagram illustrating the orientation of iso-Doppler and iso-range line as the position of the transmitter is changed.

FIG. 13 is a diagram illustrating the change in Doppler at the receiver as a function of the angle $\phi$.

FIG. 14 is a diagram illustrating the elliptical iso-range lines for the bistatic radar case.

FIG. 15 is a diagram illustrating a polar format.

FIG. 16 is a diagram illustrating a format for the bistatic case.

FIG. 17 is a diagram illustrating for the bistatic case the location of three targets, a receiver, and a circular flight path about the target site for the transmitter.

DETAILED DESCRIPTION OF THE INVENTION

Figure 1:
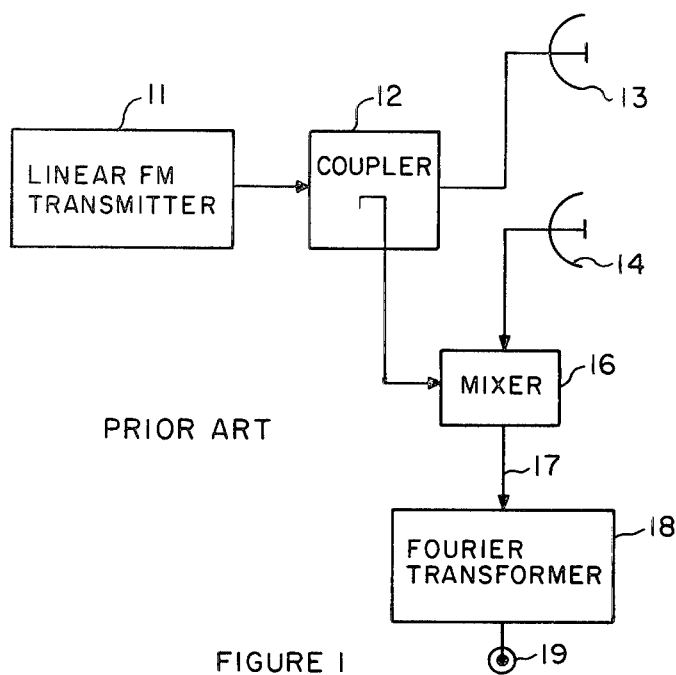
FIG. 1 is a block diagram of a Stretch radar.
Figure 3:
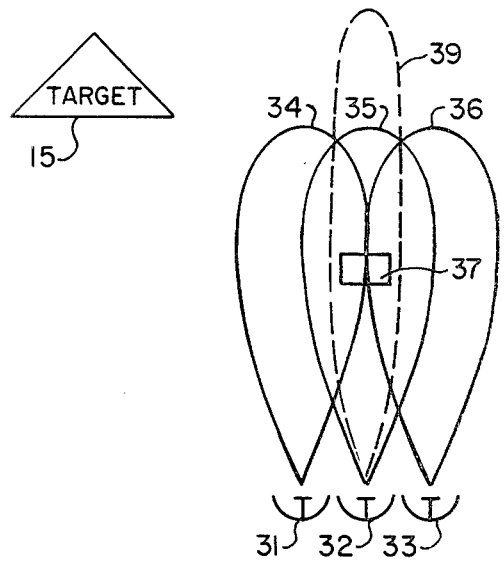
FIG. 3 is a pictorial diagram illustrating the antenna pattern produced by a SAR antenna.
Figure 2:
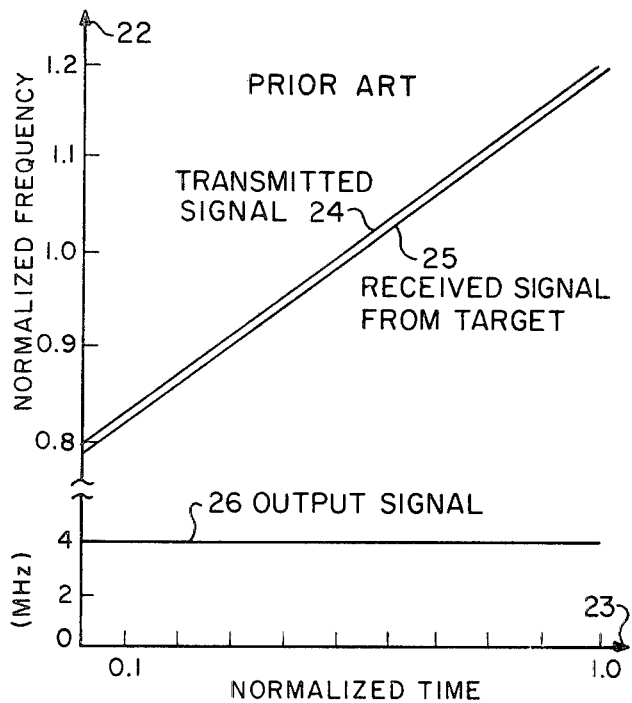
FIG. 2 is a graph showing the relation of the transmitted and received signals of a Stretch radar.
Figure 4:
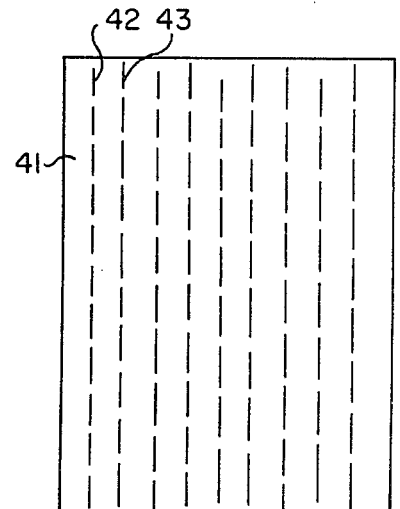
FIG. 4 is a film strip illustrating the method of recording conventional SAR data.
Figure 5:
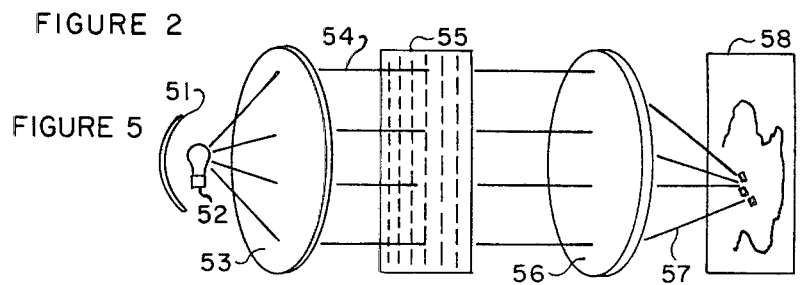
FIG. 5 is a pictorial diagram of a method of producing an image from a SAR film.
Figure 6:
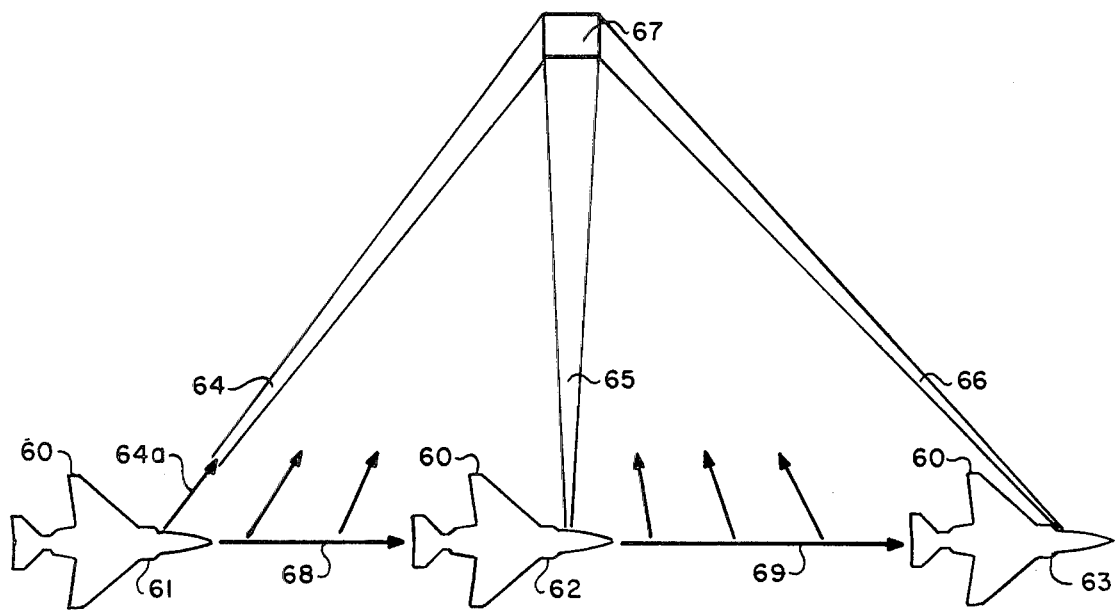
FIG. 6 is a diagram illustrating the operation of a Spotlight radar.
Figure 7:
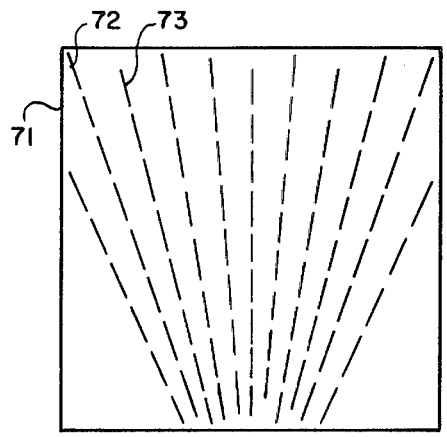
FIG. 7 is a pictorial diagram of SAR data recorded in polar format.
Figure 8:
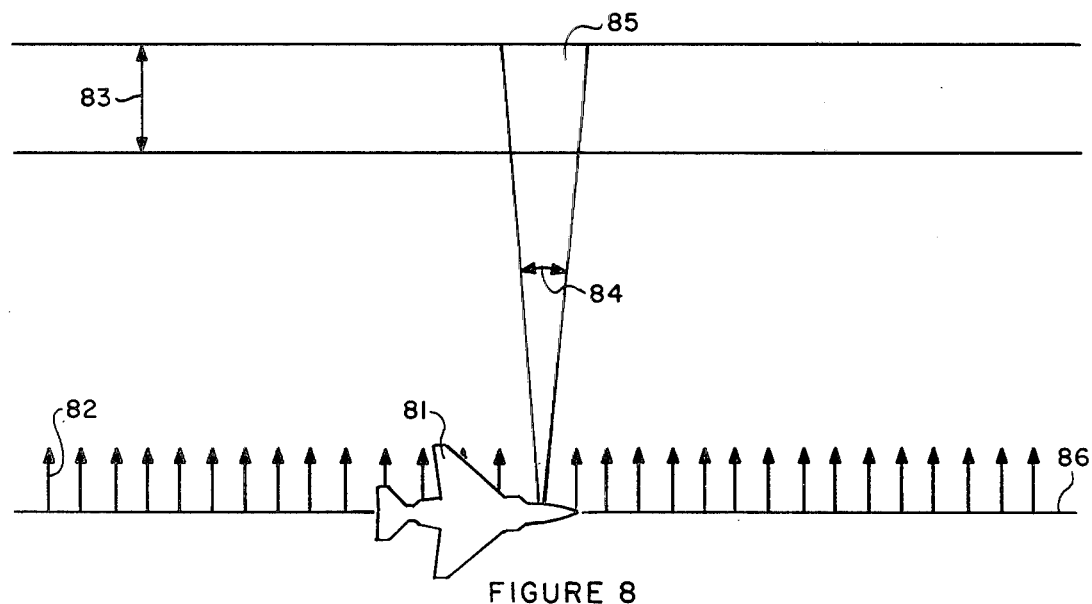
FIG. 8 is a pictorial illustration of the ground area covered by a conventional side-looking SAR radar.

It is possible to correct completely for both iso-Doppler and iso-range line rotations by means of the present invention. This correction can be explained by considering the monostatic polar recording format previously shown in FIG. 7 and expanded in FIG. 15. In FIG. 15, a series of radial recording traces 1501 are drawn from the center of the recording medium 1503. The trace angle 1502 is referred to as the monostatic polar angle.

Briefly, the procedure used for bistatic data correction is to rotate the Doppler frequency direction of the storage surface in synchronism with the apparent rotation of the iso-Doppler lines across the field of view. This is accomplished by rotating not only the storage surface, as in conventional polar format storage of FIG. 15, but also by rotating the read-in scan line. Either digital storage for real-time processing, or film storage for optical processing can be used. In an optical recorder, read-in scan line rotation can be performed by rotating the cathode-ray tube trace through half the angle that the storage film surface is rotated.

The data storage format for the present invention using Stretch-Spotlight data obtained from a bistatic radar is shown in FIG. 16. In this Figure, a series of traces 1609 are drawn about the center of a storage surface 1601. These traces are at an angle $\theta/2$ 1604 with the vertical axis of this drawing. The trace position $\theta$, 1602 is equal to the angle between the line drawn from the transmitter to the target and the line drawn from the receiver to the target, which is the bistatic angle, $\theta$. The direction and length of the trace varies for each different position of the transmitter and receiver.

Figure 18:
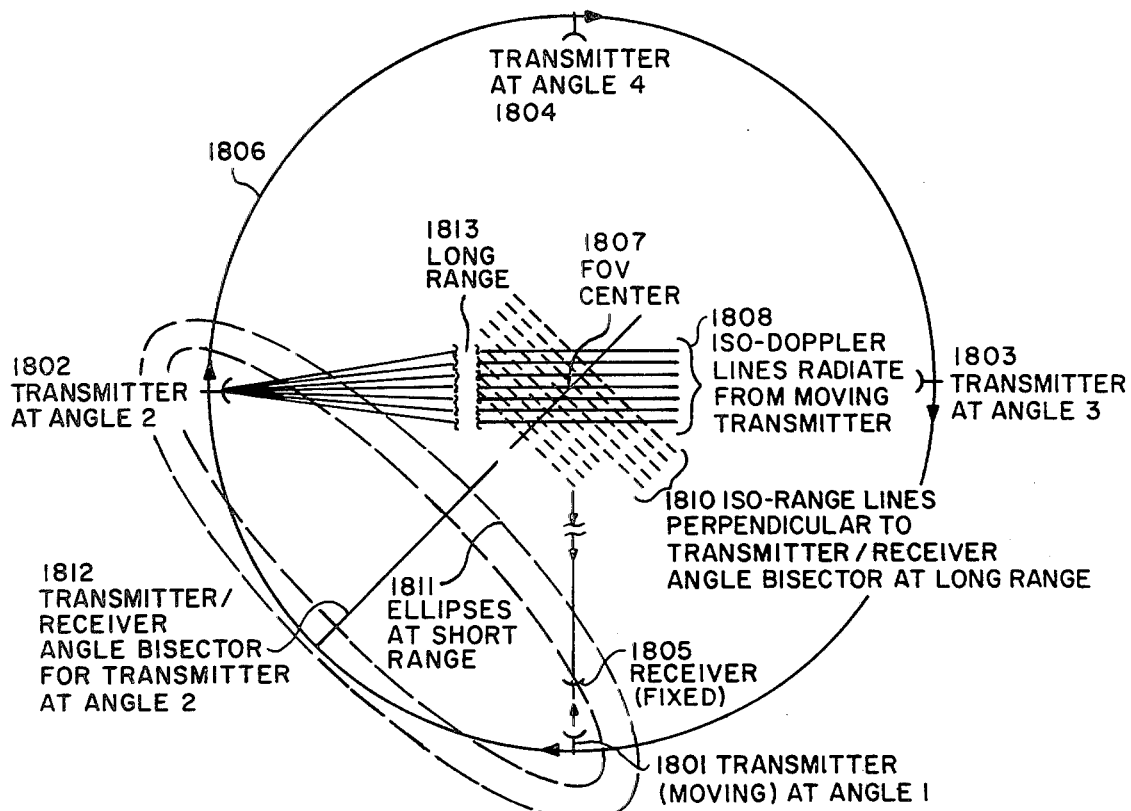
FIG. 18 is a diagram illustrating the relationship between the transmitter-receiver angle bisector and the iso-range lines.

FIG. 17 shows the transmitter circling the field of view. The transmitter starts at angle 1 designated by drawing numeral 1701 and fly along flightpath 1706 to angle 2 1702, angle 4 1704, angle 3 1730, and finally, back to angle 1. The FOV is 1707 containing illustrative targets A 1708, C 1709 and B 1710. FIG. 18 is a superposition on FIG. 17 of the iso-Doppler and iso-range lines with the transmitter at angle 2 which is designated 1802 in FIG. 18.

The corresponding simplified radar configuration for FIGS. 16 and 17 is shown in FIG. 18. In this Figure, a transmitter traverses a circular flight path 1806 about FOV 1807. Four transmitter positions, 1801, 1802, 1803, and 1804, are indicated about the flight path. The receiver 1805 is assumed to be either fixed or moving directly towards the FOV. Iso-Doppler lines 1808 are shown as produced by the aircraft at position 1802. These lines are shown as being essentially parallel across the field of view because of the long range of the transmitter, as indicated by drawing numeral 1813. The iso-range lines 1810 are shown perpendicular to transmitter-to-FOV-to-receiver angle bisector 1812. At short range the iso-range lines are ellipses 1811. However, in the small area of the FOV they appear as the parallel lines 1810.

The data is stored upon a surface which counterrotates in synchronism with the rotation of the iso-Doppler lines, by a recording trace or scan line which counterrotates in synchronism with the rotation of the iso-range lines, as in FIG. 16. The recording trace positions 1605, 1606, 1607, 1608 correspond to transmitter positions 1802, 1804, 1803, and 1801, respectively.

Figure 19:
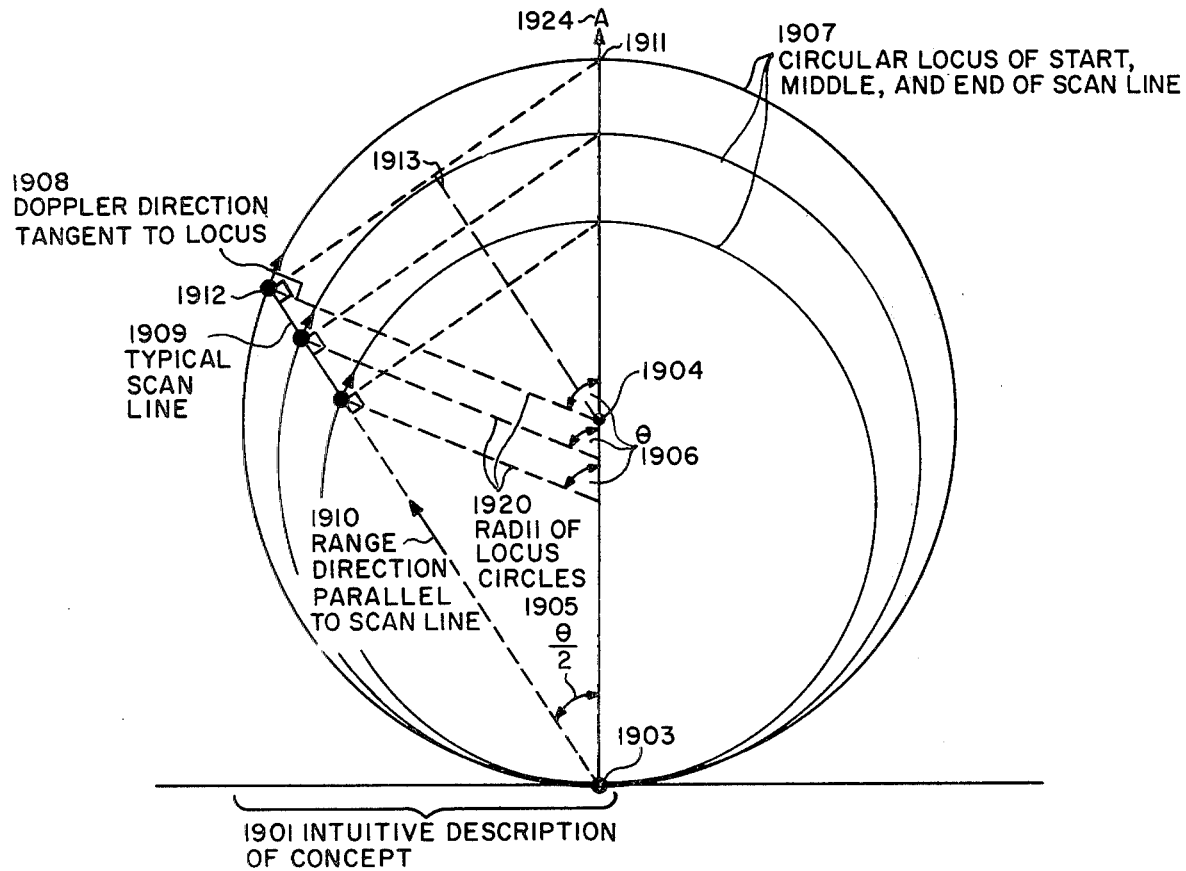
FIG. 19 is a diagram illustrating the bistatic recording format and the relation of the direction of the recording trace to the bistatic angle.

The reason that the storage geometry of FIG. 16 matches the radar geometry of FIG. 18 is most easily understood with the aid of FIG. 19. In FIG. 19, a vertical axis is drawn from an origin 1903 to a point A 1924. Three circles 1907, centered on the vertical axis 1924 are drawn through the origin 1903. These circles represent the boundaries of the start, middle and end of the scan lines of FIG. 16. The inner circle represents the start-of-scan boundary while the outer circle represents the end-of-scan boundary. A typical scan line 1909 is drawn from the origin 1903 to the outer circle. Only the portion between the inner and outer circle is darkened as this is the only portion along which information will be printed. The direction of the scan line 1910 is parallel to the range direction. The angle $\theta/2$ 1905 is the angle the scan line makes with the vertical axis. Radii of the three circles 1920 drawn from the center of each circle on the vertical axis intersect the circles along the typical scan line 1909. A Doppler direction arrow 1908 is drawn at the end of the typical scan line tangent to the outer circle.

Note that the locus of points having the same relative time on the scan line, such as, the beginning, middle or end of the trace, is a circle, centered on the vertical or Y-axis, and the trace direction is always radial from the origin 1903. The Doppler direction is tangent to the locus of the point of constant time, or perpendicular to the radius of each circular locus.

Consider the outer circle, centered at 1904 with a diameter equal to the line length from 1903 to 1911. Using radii 1904 to 1911 and 1904 to 1912, draw the triangle 1911-1904-1912 with altitude 1904 to 1913 perpendicular to line 1911-1912. Since radius 1904-1911 equals radius 1904-1912 triangle 1911-1904-1912 is isosceles. Then angle 1911-1904-1913 is equal to angle 1912-1904-1913. Angle 1911-1904-1913 equals one-half angle 1911-1904-1912 and therefore also equals one-half angle 1906. Now triangle 1903-1912-1911 is inscribed in a semicircle, and is therefore a right triangle with line 1903-1912 perpendicular to line 1912–1911. Therefore, line 1903-1912 is parallel to line 1904–1913 and angle 1906 is proven equal to twice angle 1905. From plane geometry, therefore, the Doppler direction is perpendicular to the $\theta$ direction for every point on the typical scan line, while the range direction is parallel to $\theta/2$.

A recognized property of a two dimensional Fourier transform is it exhibits polar symmetry; that is, rotating the data causes only a corresponding rotation of the image and there is no distortion or resolution loss. It follows that rotation of the range-frequency direction of the data causes only a corresponding rotation of the iso-range lines in the image; likewise, rotation of the Doppler frequency direction causes a corresponding rotation of the iso-Doppler lines in the image.

If the angle $\theta$ is synchronized to the instantaneous bistatic angle, the iso-Doppler lines will be maintained in a constant direction on the image. The iso-range lines, which rotate at half the rate of the transmitter-to-FOV-to receiver bistatic angle, will automatically be synchronized to the angle $\theta/2$ which is the trace or range-frequency direction; hence, the iso-range lines will be maintained in a constant direction on the image. If $\theta$ is chosen to be zero when the transmitter-to-FOV-to receiver angle is zero, the iso-range and Doppler lines will be perpendicular when the transmitter is at position 1801 and will therefore be perpendicular everywhere, that is independent of $\theta$.

Also note that FIG. 19 shows that the trace length is proportional to $\cos \theta/2$, and shrinks as the bistatic geometry deviates from nearly monostatic to compensate for the bistatic dilution of range resolution.

To clarify the geometry in the more general case when the receiver is allowed to move, it is useful to consider an equivalent configuration in which the receiver-to-field of view direction is used as a reference, and the field of view is imagined to rotate, rather than the receiver. Then it is clear that the required processing is that of the simple nonrotating receiver case previously described plus an additional rotation of the recording medium equal to the apparent rotation of the field of view. These solutions are verified by the following mathematical analysis; first for a nonrotating receiver, then for a rotating one.

Figure 20:
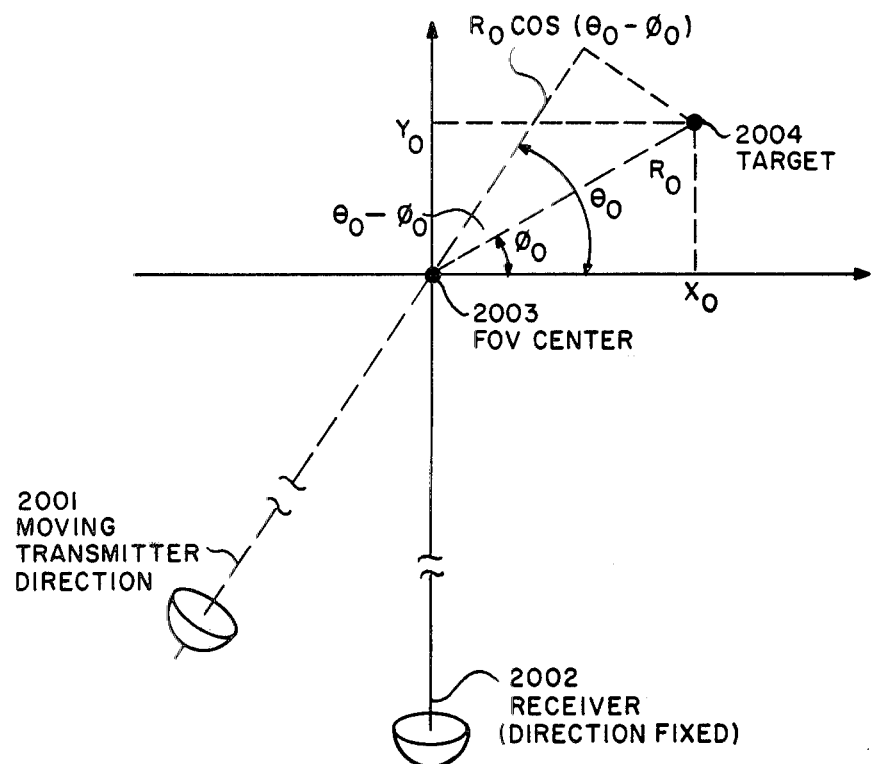
FIG. 20 is a diagram illustrating the geometric relations for the bistatic case for a moving transmitter.

The data received from the target is to be processed using the present invention followed by two-dimensional Fourier transform to obtain an image. In FIG. 20, a target 2004 is located near the center of a field of view (FOV) 2003. A transmitter 2001 moves about the FOV while a receiver 2002 holds a fixed direction towards the center of the FOV. The symbols $\phi_o$, $\theta_o$, $R_o$, $X_o$, and $Y_o$ denote the angles and points of the geometric construction shown in the figure. In particular, $X_o$ and $Y_o$ are the coordinates of the target. The angle the transmitter makes with the FOV center is $\theta_o$, previously denoted $\theta$, the bistatic angle, while the angle the target makes with the FOV center is $\phi_o$. The distance of the target from the FOV center is designated $R_o$. To simplify the analysis the following assumptions will be made.

The receiver and transmitter are coplanar with and at long range from the FOV; that is, the angle subtended by the FOV as seen from both the receiver and the transmitter is small. Thus, the iso-range lines are taken as straight and parallel, as are the iso-Doppler lines.

The receiver is fixed in angle relative to the FOV. The $Y_o$-axis is defined as the receiver-FOV direction. However, the receiver-to-FOV distance can be changing.

The transmitter is moving in angle relative to the FOV, and potentially can circumnavigate the FOV. The transmitter to FOV distance can also be changing.

A Stretch-Spotlight receiver with a long pulse and wide bandwidth is assumed.

In the Stretch-Spotlight receiver a reference signal is generated which models the expected return from a target location at the FOV center. The phase of this reference can be taken as $$\text{Reference Phase} = \omega_o t + \gamma t^2 \tag{1}$$

where $\omega_o$ and $\gamma$ are the radian frequency and one-half the radian chirp slope. The return from a target is delayed by $\tau$ from the reference. Its phase is:

$$\text{Signal Phase} = \omega_o(t-\tau) + \gamma(t-\tau)^2 \tag{2}$$

In the receiver, the reference and signal are mixed to obtain the video phase, which is then stored for processing. Subtracting equation 2 from 1:

$$\text{Video Phase} = \omega_o \tau + 2\gamma\tau t - \gamma\tau^2$$

For high time-bandwidth the last term vanishes:

$$\text{Video Phase} = (\omega_o + 2\gamma t)\tau \tag{3}$$

Using the geometry of FIG. 16 we can relate the differential range delay, $\tau$, to target position ($X_o$, $Y_o$). Total differential range is the sum of the transmitter and receiver path lengths:

$$\tau = 1/C[R_o \cos(\theta_o - \phi_o) + X_o] \tag{4}$$

Using the trigonometric identity $$\cos(\theta_o - \phi_o) = \cos\theta_o \cos\phi_o + \sin\theta_o \sin\phi_o \tag{5}$$

and the polar coordinates of the target $$X_o = R_o \cos\phi_o, \quad Y_o = R_o \sin\phi_o \tag{6}$$

we obtain from equations 5 and 6
$$R_o \cos(\theta_o - \phi_o) = X_o \cos\theta_o + Y_o \sin\theta_o \tag{7}$$

and from equations 4 and 7
$$\tau = 1/C[Y_o \sin\theta_o + X_o(1 + \cos\theta_o)] \tag{8}$$

The intuition leading to the present invention format has been described previously. The key provisions are that the polar storage angle ($\theta_p$) should rotate at half the rate of the transmitter angle ($\theta_o$), and that the scan length should diminish as the geometry deviates from monostatic. Hence, we intuitively let:

$$\theta_o = 2\theta_p \tag{9}$$

$$R_p = (v_s \cos\theta_o/2)(K+t) \tag{10}$$

where the polar and rectangular coordinates of the storage point ($R_p$, $\theta_p$) or ($X_p$, $Y_p$) are related by $$X_p = R_p \cos\theta_p, \quad Y_p = R_p \sin\theta_p \tag{11}$$

and $v_s$ is the maximum scan velocity, K is the storage trigger delay which will be evaluated later.

Combining equations 8 and 9 gives $$\tau = 1/C[X_o(1 + \cos 2\theta_p) + Y_o \sin 2\theta_p] \tag{12}$$

Using the double angle trigonometric identities $$\tau = 2/C[X_o \cos^2\theta_p + Y_o \sin\theta_p \cos\theta_p] \tag{13}$$

Using equation 11, $$\tau = \frac{2}{C}\left[X_o \frac{X_p}{R_p} \cos\theta_p + Y_o \frac{Y_p}{R_p} \cos\theta_p\right] \tag{14}$$

Using equation 10

$$\tau = \frac{2}{C v_s (K+t)} [Y_o Y_p + X_o X_p] \tag{15}$$

Using equation 3

$$\text{Video Phase} = \frac{2(\omega_o + 2\gamma t)}{C v_s (K+t)} [Y_o Y_p + X_o X_p] \tag{16}$$

To eliminate the dependence on time, we must let the trigger delay $$K = \omega_o/2\gamma \tag{17}$$

To determine the locus of the points of zero video phase, we set video phase equal to $2\pi n$ where n is any integer. Combining equations 16 and 17 gives for the lines of zero phase:

$$2\pi n = \frac{4\gamma}{C v_s}[Y_o Y_p + X_o X_p]$$

or in standard form, $$Y_p = -\frac{X_o}{Y_o} X_p + \frac{n\pi C v_s}{2 Y_o \gamma} \tag{18}$$

Equation 18 represents a family of straight lines of slope $$-\left[\frac{X_o}{Y_o}\right]$$

with intercepts separated by $$\frac{\pi C v_s}{2 Y_o \gamma}$$

which is the correct grating to Fourier transform into an image of the object point. Equation 17 is equivalent to requiring $f_1/f_2 = R_{p1}/R_{p2}$ where $f_{1,2}$ and $R_{p1,2}$ are the start and finish transmitter frequencies and trace positions.

Figure 23:
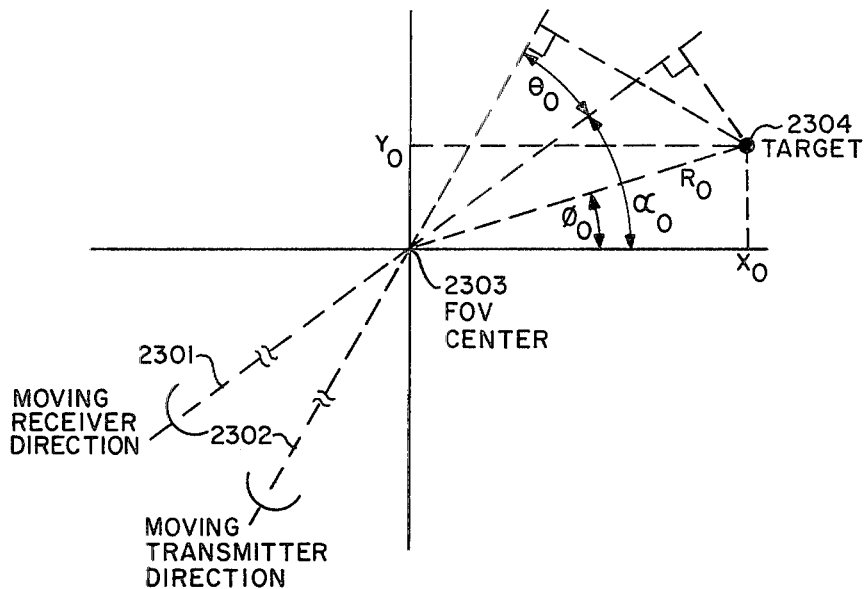
FIG. 23 is a modification of FIG. 20.

Now we will consider the more general case, when both transmitter and receiver are allowed to rotate. First, FIG. 20 is modified, as shown in FIG. 23, to allow for arbitrary receiver angle $\alpha_o$. The last two digits of the drawing numerals in FIG. 23 are the same as those in FIG. 20 for the corresponding elements.

Equations 1 through 3 are unchanged.

Reference Phase = $\omega_o t + \gamma t^2$ (1)

Signal Phase = $\omega_o(t-\tau) + \gamma(t-\tau)^2$ (2)

Video Phase = $(\omega_o + 2\gamma t)\tau$ (3)

In the figure, $\theta_o$ remains defined as the bistatic angle. The angle $\alpha_o$ is introduced as the receiver direction in the object space coordinate system. Then the path length difference between the point and the center of the field of view, and the corresponding delay difference becomes:

$$\tau = 1/C[R_o \cos(\theta_o + \alpha_o - \phi_o) + R_o \cos(\alpha_o - \phi_o)] \quad (4')$$

The equation is denoted 4' as it is the modified version of equation 4 presented previously. Since the target position in rectangular coordinates is still:

$$X_o = R_o \cos \phi_o \qquad Y_o = R_o \sin \phi_o \quad (6)$$

we can use the trigonometric identity 5 to obtain:

$$\cos(\theta_o + \alpha_o - \phi_o) = \cos(\theta_o + \alpha_o)\cos\phi_o + \sin(\theta_o + \alpha_o)\sin\phi_o$$
$$= \frac{X_o}{R_o}\cos(\theta_o + \alpha_o) + \frac{Y_o}{R_o}\sin(\theta_o + \alpha_o) \quad (7')$$
$$\cos(\alpha_o - \phi_o) = \frac{X_o}{R_o}\cos\alpha_o + \frac{Y_o}{R_o}\sin\alpha_o$$

and from equations 4' and 7'

$$\tau = 1/C[Y_o\{\sin(\theta_o + \alpha_o) + \sin\alpha_o\} + X_o\{\cos(\theta_o + \alpha_o) + \cos\alpha_o\}]$$

or using the trigonometric identities $$\tau = \frac{1}{C}[Y_o(\sin\theta_o\cos\alpha_o + \cos\theta_o\sin\alpha_o + \sin\alpha_o) + \quad (8')$$
$$X_o(\cos\theta_o\cos\alpha_o - \sin\theta_o\sin\alpha_o + \cos\alpha_o)]$$

The general storage trace equations again were discovered intuitively. They are:

$$\theta_p = \frac{\theta_o}{2} + \alpha_o \quad (9')$$

$$R_p = \left(v_s \cos\frac{\theta_o}{2}\right)(K + t) \quad (10')$$

where, as before, the storage point coordinates are related by $$X_p = R_p \cos\theta_p \qquad Y_p = R_p \sin\theta_p \quad (11)$$

Rearranging equation 11, substituting equation 9', and using the trigonometric identities gives $$\frac{X_p}{R_p} = \cos\frac{\theta_o}{2}\cos\alpha_o - \sin\frac{\theta_o}{2}\sin\alpha_o \quad (12')$$

$$\frac{Y_p}{R_p} = \cos\frac{\theta_o}{2}\sin\alpha_o + \cos\alpha_o\sin\frac{\theta_o}{2}$$

Using the half-angle trigonometric identities in equation 8' gives $$\tau = \frac{1}{C}\Bigg\{Y_o\bigg[2\sin\frac{\theta_o}{2}\cos\frac{\theta_o}{2}\cos\alpha_o + \quad (13')$$
$$\left(2\cos^2\frac{\theta_o}{2} - 1\right)\sin\alpha_o + \sin\alpha_o\bigg] +$$
$$X_o\bigg[\left(2\cos^2\frac{\theta_o}{2} - 1\right)\cos\alpha_o -$$
$$2\sin\frac{\theta_o}{2}\cos\frac{\theta_o}{2}\sin\alpha_o + \cos\alpha_o\bigg]\Bigg\}$$

$$\tau = \frac{1}{C}\Bigg\{Y_o\bigg[2\sin\frac{\theta_o}{2}\cos\frac{\theta_o}{2}\cos\alpha_o + 2\cos^2\frac{\theta_o}{2}\sin\alpha_o\bigg] +$$
$$X_o\bigg[2\cos^2\frac{\theta_o}{2}\cos\alpha_o - 2\sin\frac{\theta_o}{2}\cos\frac{\theta_o}{2}\sin\alpha_o\bigg]\Bigg\}$$

Combining equation 12' with equation 13' gives $$\tau = \quad (14')$$
$$\frac{1}{C}\Bigg\{Y_o\left(2\cos\frac{\theta_o}{2}\right)\left(\frac{Y_p}{R_p}\right) + X_o\left(2\cos\frac{\theta_o}{2}\right)\left(\frac{X_p}{R_p}\right)\Bigg\}$$

Substituting equation 10' in equation 14' gives $$\tau = \frac{2}{C v_s(K+t)}[Y_o Y_p + X_o X_p] \quad (15')$$

which is identical to equation 15. Hence, the remainder of the analysis applies, and the data is a family of straight lines which is the correct grating to Fourier transform into an image of the target point. The lines are again independent of bistatic angle, $\theta_o$, or receiver direction $\alpha_o$, verifying the correctness of the general equations 9' and 10'.

Figure 24:
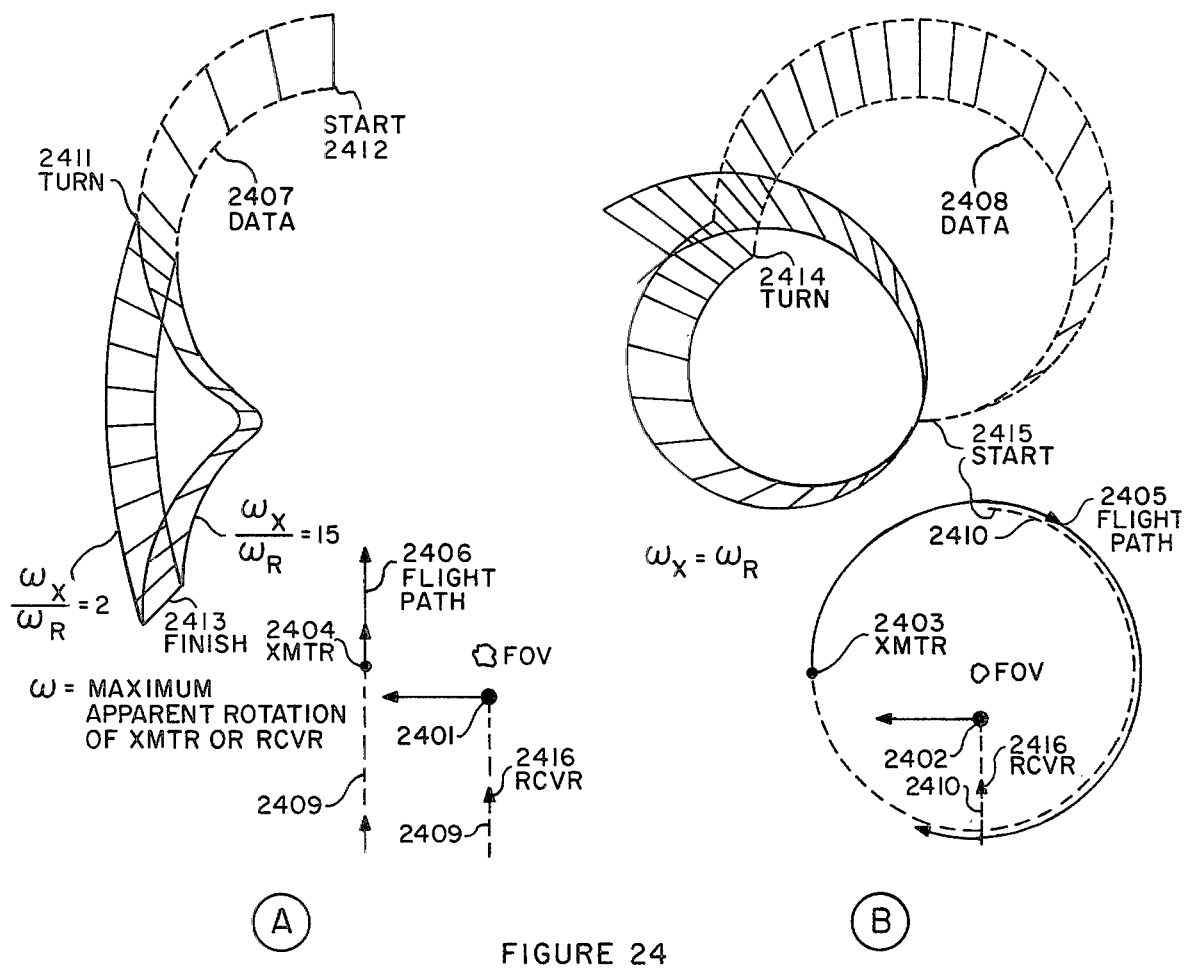
FIGS. 24A and B are a plot of two flight path examples.

The general analysis shows how to store the data for any receiver or transmitter motion. Two examples are presented in FIG. 24. In each case the receiver 2416 executes a 90-degree turn, 2401 and 2402. In FIG. 24B, the transmitter 2403 circles at long range along a flightpath 2405. In FIG. 24A the transmitter 2404 flys a straight line 2406. Both slow and fast receiver speeds are illustrated. Data 2407, 2408 and flightpaths 2409, 2410 prior to the turns 2411 and 2414 are shown dashed.

Drawing numerals 2415 and 2412 indicate the start of the data collection and 2413 indicates the end of the data collection.

The bistatic angle $\theta$ and the receiver direction angle $\alpha$ are obtained from calculations based on the location of the transmitter and receiver with respect to the field of view. The location of the transmitter and the receiver can be obtained from inertial navigational systems aboard the aircraft or this information may be obtained from a ground based radar which is capable of tracking both the transmitter and receiver aircrafts.

From the preceding discussion, it can be seen that the purpose of the invention is to record bistatic radar information so that it may be retrieved in rectangular coordinate form and be converted to an image by conventional Fourier transform means. The basic functions which must be carried out are:

1. The video scan must be started at a point along a radius from the origin proportional to the product of cosine $\theta/2$ and a value equal to the start frequency of the transmitter divided by the slope of the transmitted FM signal, $\omega_o/2\gamma$
2. The scan must then be compressed by an amount proportional to cosine $\theta/2$.
3. The recording medium must be set to an angle equal to $\theta/2$ for each scan when the receiver does not rotate or $\theta/2+\alpha$ otherwise.

Figure 21:
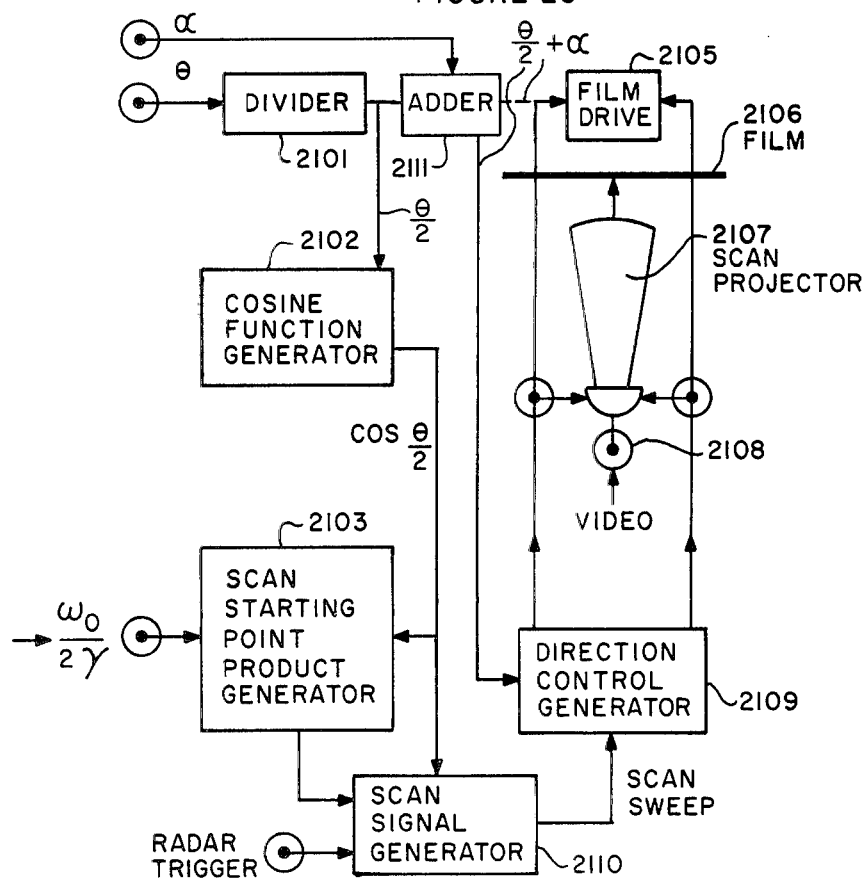
FIG. 21 is a block diagram illustrating a first embodiment of the present invention.

A system for recording bistatic data in accordance with the present invention is shown in FIG. 21. This system comprises a divider 2101, a cosine function generator 2102, a scan starting point product generator 2103, a scan signal generator 2110, a directional control generator 2109, a scan projector 2107, a film 2106, a drive means 2105, and an adder 2111.

In the operation of this system, a signal representing the bistatic angle is fed to an input port of the divider 2101 to produce at its output port a signal representing one-half the bistatic angle. The signal representing one-half the bistatic angle is supplied to the Cosine Function Generator to provide at its output port a signal representing the cosine of one-half the bistatic angle. The scan starting point generator accepts this signal and a signal representing the transmitter start frequency divided by the slope of the transmitted FM to produce at its output port a signal representing the product of the two input signals. The Scan Signal Generator accepts the product signal to determine the point along a radius away from the origin at which the scan will start and accepts the signal representing the cosine of one-half the bistatic angle to compress the scan after the starting point by an amount which is proportional to the cosine of one-half the bistatic angle. The Scan Signal Generator also accepts the radar trigger signal to determine the start time of the scan.

The adder 2111 adds the receiver angle $\alpha$ to one-half the bistatic angle. The Directional Control Generator accepts the signal representing the sum of the receiver angle and one-half the bistatic angle and the output of the scan signal generator. From the radial scan and the angle, it generates the corresponding horizontal and vertical sweeps.

The Scan Projector accepts the output signals of the Directional Control Generator to produce a scan beginning at a starting point that is at a specified distance away from the origin, which is simply a reference point for the display of the received radar video. The specified distance is proportional to the product value. The scan is projected at an angle that is equal to one-half the bistatic angle plus the receiver angle from an arbitrary angular reference. The scan speed, after the initiation point, is proportional to the cosine of one-half the bistatic angle.

In a typical embodiment, the scan projector is a cathode-ray tube (CRT). The scan signal generator provides control signals to the CRT to produce display similar to that shown in FIG. 24.

The angle at which the trace is projected may be set by means of the CRT or alternatively by means of orienting the recording medium. A typical recording medium is film, such as the film 2106 shown positioned in front of the CRT.

In the alternative approach, the film is oriented by the film drive unit 2105 which is driven directly by the $\theta/2+\alpha$ signal obtained from 2111. In this approach, the initiation of each scan at a starting point away from the origin may be accomplished in the Scan Signal Generator by producing control signals which initiate the scan in synchronism with the radar trigger. The trace is rapidly moved to the starting point, after which the speed of the trace is made proportional to the cosine of one-half the bistatic angle. The video data containing the received radar information for each scan is fed to the video input port 2108 of the scan projector to modulate the beam intensity of the CRT.

The invention may also be implemented in digital form. It is possible to carry out digitally all the operations, including the scaling, delay, rotation, and recording functions. The former three can be considered data address change operations and may be carried out in a digital address generator, such as that shown in the system of FIG. 22.

The system in this Figure comprises a radius address generator 2210, an X-Y address generator 2216, and an angle address generator 2215, as well as four analog to digital converters (A/D) 2201, 2208, 2220 and 2212, a short term memory 2204, a long term memory 2205, a multiplier 2209, a divider 2213, an internal clock generator 2218, and a cosine function generator 2214 and adder 2221.

Radar video information is received at the input port 2202 of A/D 2201, where it is converted to digital form and stored in the short term memory 2204. The bistatic angle $\theta$ is received at the input port 2211 of A/D 2212, where it is converted to digital form and then supplied, through the divider 2213, to the cosine function generator 2214 to produce the function cosine $\theta/2$.

The transmitter start frequency divided by the slope of the transmitted FM signal, $\omega_o/2\gamma$ is received at the input port 2207 of A/D 2208, where it is converted to digital form and then supplied to the multiplier 2209. The multiplier receives the cosine $\theta/2$ signal from the cosine function generator 2214 and supplies the product $\omega_o/2\gamma$ cosine $\theta/2$ to the radius address generator 2210. The radar trigger and a radar clock signal, which are received at input port 2206, are supplied to the radius address generator 2210 and clock generator 2218.

The cosine function generator also supplies a signal representing cosine $\theta/2$ to the clock generator 2218, which produces slow clock signals at a rate equal to the input clock rate multiplied by cosine $\theta/2$. This clock signal is supplied to the Radius Address Generator 2210.

The radar video data is advanced through A/D 2201 by the internal clock signal supplied by generator 2218. This clock signal also advances the radius generator starting at the advanced address determined by the shift signal obtained from multiplier 2209, during data read-in to short term memory 2204. During data read-out from memory 2204, the radius address generator is advanced by the normal radar clock signal 2206 starting from the first address.

The receiver angle α is applied to the input port 2219 of A/D 2220 where it is converted to digital form, then added in adder 2221 to the value $\theta/2$ supplied by divider 2213.

The value $\theta/2 + \alpha$ is supplied to the angle address generator 2215 by the adder 2221. The output of the angle address generator 2215 and radius address generator 2210 as well as the output of the short term memory 2204 are supplied to the long term memory 2205.

Figure 22:
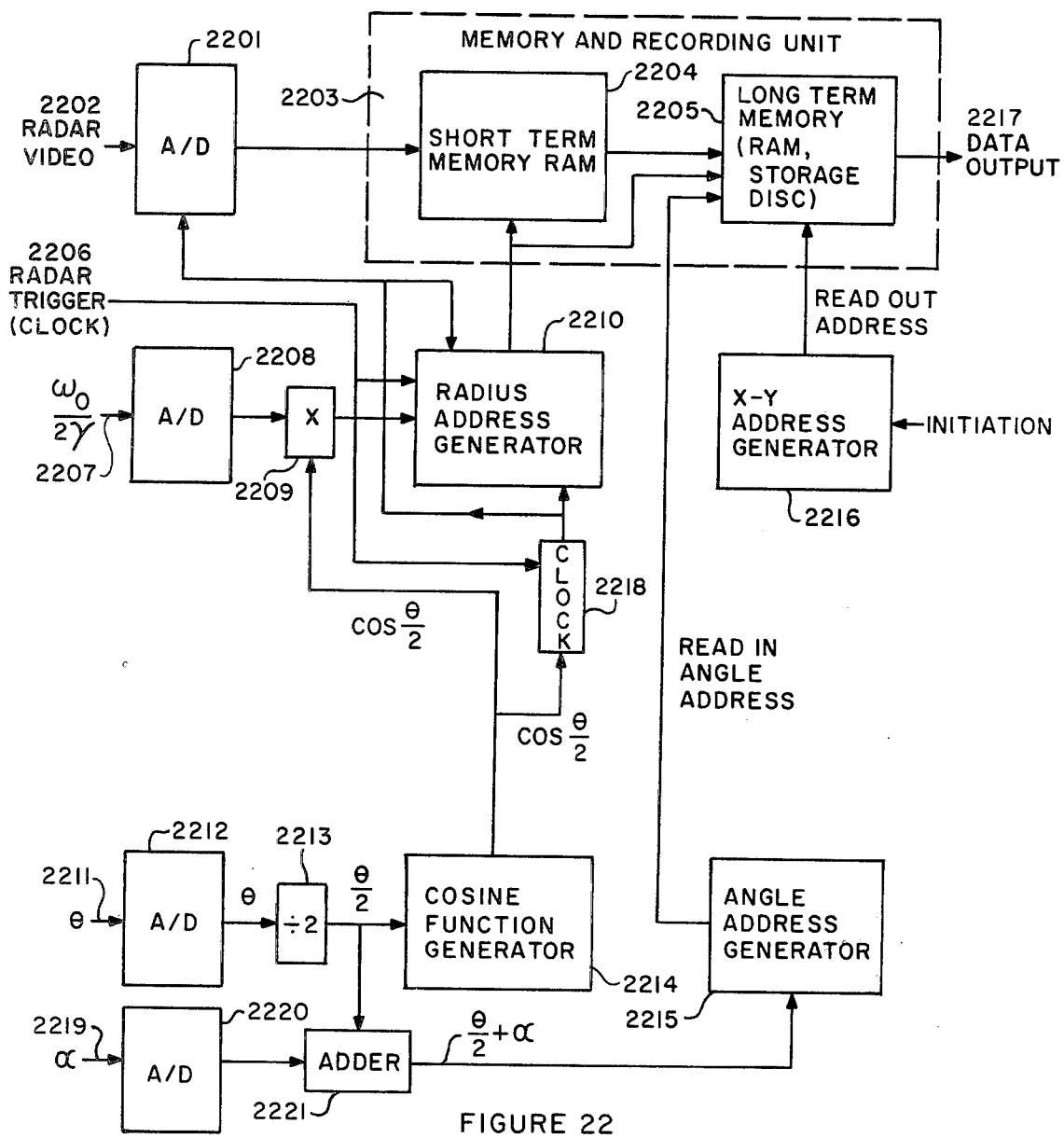
FIG. 22 is a block diagram illustrating a second embodiment of the present invention.

In the operation of the system of FIG. 22, video data is shifted into the short term memory 2204 from A/D 2201 in accordance with the slow internal clock signals. It is stored in this memory at addresses determined by the Radius Address Generator, starting in accordance with the product $\omega_o/2\gamma \cos \theta/2$.

The storing of video data into the memory at a starting address in accordance with the product signal accomplishes the requisite shift in starting point, which is the first step required in reformatting the data. In the second step, data compression proportional to cosine $\theta/2$ is accomplished by providing slowly incrementing radius addresses for the short term memory determined by the clock 2218, which is controlled by a signal representing cosine $\theta/2$. The third basic step, which is setting the recording medium or the radial trace to an angle equal to $\theta/2 + \alpha$ is accomplished by the angle address generator and the memory 2205. In effecting this third function, the video data is read out from the memory 2204 into the memory 2205 using the read in angle address obtained from generator 2215 which is shifted in accordance with the value $\theta/2 + \alpha$.

Information is retrieved from the output port 2217 of memory 2205 in rectangular coordinates by entering rectangular address signals from the X-Y generator 2216.

It should be noted that memories 2204 and 2205 may be random access memories (RAMS) and therefore both may be combined into a single unit, as indicated by the dashed lines about these two units. The single memory unit is designated 2203, and is referred to as the memory and recording unit.

Alternatively, the long term memory may be provided by other forms of data storage such as the CRT and film system of FIG. 21. In this case, the long term memory could be a conventional polar format camera, and the short term memory can be considered a bistatic to monostatic format converter. Furthermore, if an analog long term memory is used, an accelerated internally generated clock signal can be used for data readout from short term memory 2204 provided by generator 2218, in which case the radar clock 2206 would be used for data read-in.

Having described my invention, I claim:

1. Apparatus for correcting data from a bistatic synthetic aperture radar, of the type employing Stretch and Spotlight techniques to eliminate distortions due to the relative positions and motions of the radar transmitter and receiver with respect to a target, said apparatus accepting signals representing the bistatic angle, the receiver angle, the transmitter start frequency divided by the slope of the transmitted FM signal, the radar trigger and the received radar video, comprising:

(a) a divider means, having an input port and an output port, said divider means accepting at its input port the signal representing the bistatic angle, and producing at its output port a signal representing one-half the bistatic angle, (b) an adder means having two input ports and an output port, said adder means accepting at one input port, the receiver angle and at its other input port the signal representing one-half the bistatic angle from said divider means, and producing at its output a signal representing one-half the bistatic angle plus the receiver angle, (c) a cosine function generator means having an input port and an output port, said cosine function generator means accepting at its input port the signal representing one-half the bistatic angle from said divider means and producing at its output port a signal representing the cosine of one-half the bistatic angle, (d) a scan starting point product generator means with two input ports and one output port for accepting at the first input port the signal representing the transmitter start frequency divided by the slope of the transmitted FM signal and at the second input port the cosine of half of the bistatic angle for producing at the output port a signal representing the product of the two input signals, (e) a scan signal generator means with three input ports and one output port for accepting at its input ports signals representing said product, the cosine of one-half the bistatic angle and the radar trigger to produce at its output a scan sweep signal where the scan is initiated at a starting point which is at a distance away from the origin that is proportional to said product, the scan is compressed by an amount proportional to the cosine of one-half the bistatic angle and the scan is initiated from the starting point in synchronism with the radar trigger, (f) a direction control means having two input ports and an output port for accepting at its input ports a signal representing one-half the bistatic angle plus the receiver angle from the adder means and the output signal of the scan signal generator means to produce an output control signal which sets the scan direction at an angle equal to one-half the bistatic angle plus the receiver angle from an arbitrary reference angle, and (g) a scan projector means having two input ports and an output port, said scan projector accepting at its input ports the output signals of the direction control generator means and the video signal of the radar receiver to project a scan at an angle which is equal to one-half the bistatic angle plus the receiver angle from an arbitrary angular reference, beginning at a starting point a distance from the origin proportional to the starting frequency of the transmitter divided by the slope of the transmitted FM signal, said scan being compressed proportional to the cosine of the bistatic angle after initiation.

2. Apparatus as claimed in claim 1, wherein said scan projector means is a cathode-ray tube and said projector means comprises means to position a photographic film to receive a light beam projected from the cathode-ray tube to expose the film with said light beam, said directional control signal being applied to said cathode-ray tube to scan the light beam across said film, and said video signal from the radar receiver being applied to said cathode-ray tube to modulate the intensity of the cathode-ray tube light beam to convert the video data to a varying intensity light beam for recording said data on the film along a scan line.

3. Apparatus as claimed in claim 2, wherein said projector means further comprises means for varying the position of said film, said means for varying the position of said film accepting the output signal of the directional control means to cause each scan line to be recorded at an angle equal to one-half the bistatic angle plus the receiver angle from an arbitrary reference angle.

4. Apparatus for correcting data from a bistatic synthetic aperture radar, of the type employing Stretch and Spotlight techniques, to eliminate distortions due to the relative positions and motions of the radar transmitter and receiver with respect to the target and accepting signals in digital form representing the bistatic angle, the receiver angle, the transmitter start frequency divided by the slope of the transmitted FM signal, the radar trigger clock, the received radar video and read-out initiation, comprising:

(a) divider means with an input port and an output port for accepting at the input port the signal representing the bistatic angle and providing at the output port a signal representiing one-half the bistatic angle, (b) an adder means having two input ports and an output port, said adder means accepting at one input port, the receiver angle and at its other input port the signal representing one-half the bistatic angle from said divider means, and producing at its output a signal representing one-half the bistatic angle plus the receiver angle, (c) cosine function generator means with an input port and an output port for accepting at the input port the signal representing one-half the bistatic angle from said divider means and producing at the output port a signal representing the cosine of one-half the bistatic angle, (d) multiplier means with two input ports and an output port for accepting at one input port the signal representing the transmitter start frequency divided by the slope of the transmitted FM signal and accepting at the second input port the signal representing the cosine of one-half the bistatic angle from said cosine function generator means to provide at its output port a product signal representing the product of the two signals accepted at the input ports of said multiplier means, (e) internal clock generator means with two input and one output ports, said clock means accepting at its input port the signal representing the cosine of one-half the bistatic angle from said cosine function generator means and the radar clock and producing at its output port a clock signal with a rate equal to the radar input clock multiplied by the cosine of one-half the bistatic angle, (f) radius address generator means with three input ports and an output port for accepting at one input port the product signal from said multiplier, and accepting at the second input port a signal representing the radar trigger clock, while accepting at the third input port the signal from said internal clock means, to produce a read-in signal representing assigned addresses along a radius starting at a point from the origin of the radius which is proportional to the value of said product, and increasing in accordance with the internal clock, said addresses being compressed during read-out along the radius after starting at the origin by an amount proportional to the value of the cosine of one-half the bistatic angle, which value is provided by said internal clock means, (g) angle address generator means, with an input port and an output port, for accepting at the input port the signal representing one-half the bistatic angle plus the receiver angle from the adder means to produce an angular address equal to one-half the bistatic angle plus the receiver angle, (h) a short term memory means with two input ports and one output port, for accepting the radar video signal and the radius address, to provide at its output, the radar video signal with assigned addresses along the radius, (i) an X-Y address generator, with an input port and an output port, said input port accepting an initiation signal to provide at the output port a series of X-Y addresses in rectangular coordinates, and (j) a long term memory with five input ports and one output port for accepting the radar video with the assigned radius addresses from the short term memory means at one input port, the angle address signal from the angle address generator means at the second input port, the radius address at the fourth input port, and the X and Y coordinate addresses from the X-Y generator means at the fourth and fifth input ports to store radar video at the assigned radii, with an angle address in accordance with the output signal angle of the angle address generator and to subsequently provide on read-out the radar video in X-Y coordinates in accordance with the signal from the X-Y generator.

* * * * *